April 13, 1965  J. P. LAIKAM  3,177,950

VINEYARD PLOW

Filed Feb. 18, 1963

JOHN P. LAIKAM
INVENTOR

Huebner & Worrel
ATTORNEYS

United States Patent Office 3,177,950
Patented Apr. 13, 1965

3,177,950
VINEYARD PLOW
John P. Laikam, Fowler, Calif., assignor to Laikam
Plow Co., Inc., a corporation of California
Filed Feb. 18, 1963, Ser. No. 258,995
1 Claim. (Cl. 172—5)

The present invention relates to an improved vineyard plow and more particularly to a cultivating plow of the type commonly referred to as a French plow and which is adapted to work the earth between and adjacent to spaced obstructions, such as grapevines, and the like, arranged in spaced longitudinally extended rows.

A task recurrent during a growing season in vineyards, orchards, and the like, is the removal of weeds and other undesirable vegetation from closely adjacent to the growing vines, or trees, as the case may be. In many agricultural regions, it is of extreme importance to remove as much of such undesirable vegetation as possible, due to the fact that such vegetation utilizes water and plant nutrients which otherwise is available to the growing vines. In semi-arid regions which rely upon irrigation for moisture, the removal of such vegetation closely adjacent to the vines is important to minimize moisture loss.

Various types of structures have been designed previously in order to permit such closely adjacent plowing while attempting to prevent injury to the growing vines. Some of these previously known structures have employed a sensing member disposed above the surface of the earth and adapted to contact a portion of the growing vine to be protected. The sensing member is operably associated with a control means and a power device, such as an hydraulic ram, arranged in such a manner as to effect deflecting movement of the cultivating plow away from a growing vine. Such previously known devices have not been totally effective in protecting vegetation, such as grapevines, which have sub-terranean portions and roots displaced laterally relative to the row in which the trunks and other above-ground portions are disposed. Certain sub-terranean guard devices have also been employed. However, these devices have not been entirely satisfactory in that they impair the cultivating efficiency of the plow with which they are associated. Further, they do not permit the formation of clearly defined furrows which are suited to subsequent employment for irrigation purposes.

Accordingly, it is an object of the present invention to provide an improved French plow.

Another object is to provide an improved vineyard plow which permits cultivation closely adjacent to growing plants with a minimum of risk of injury thereto.

Another object is to provide an improved form of plowshare especially suited to use in the cultivation of vineyards and the like.

A further object of the invention is to provide in a vineyard plow a plowshare having means to engage subterranean obstructions and to deflect the plowshare from a normal path of travel thereby to avoid damaging contact with such obstructions.

These, together with other objects, will become more fully apparent upon reference to the following description and accompanying drawing.

Figure 1:
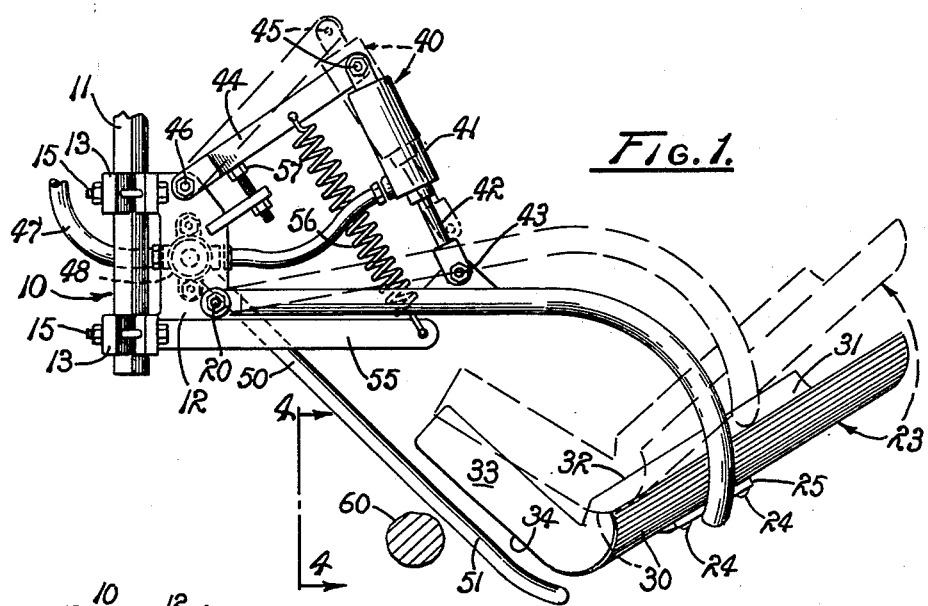
FIG. 1 is a fragmentary top plan view of a vineyard plow embodying the principles of the present invention, a growing grapevine being shown fragmentarily in horizontal section through the central vine thereof.
Figure 2:
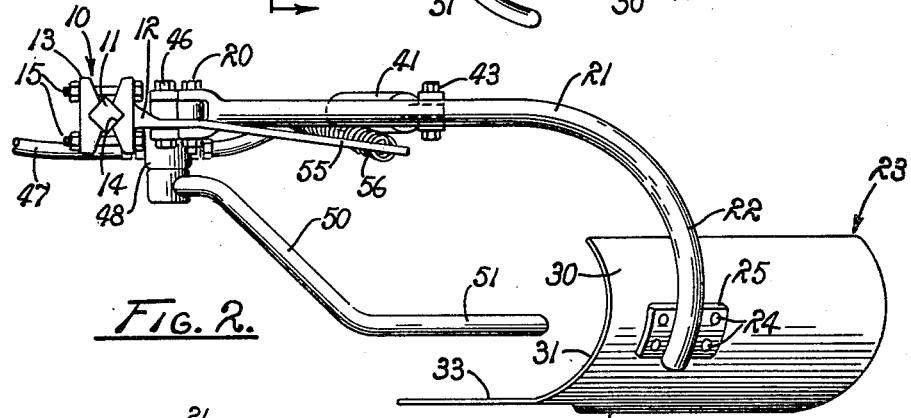
FIG. 2 is a view in side elevation of the plow shown in FIG. 1.

Referring particularly to FIGS. 1 and 2 of the drawing, a draft member is generally indicated at 10 and includes a longitudinally extended transversely disposed tool bar 11. The tool bar is adapted for attachment to a conventional tractor, or other prime mover, not shown, such attachment normally including a power lift mechanism to effect elevational positioning of the draft member. Such lift mechanisms are well-known to those skilled in the art but are not essential to the subject invention and are not illustrated in the drawing. It is understood that the draft member 10 by means of any suitable prime mover is adapted for earth traversing movement along a predetermined path of travel closely adjacent to a row of spaced obstructions, such as grapevines, trees, and the like.

The draft member 10 includes a mounting frame 12 rigidly secured to the tool bar by clamping brackets 13 longitudinally spaced therealong. The brackets are provided with complementarily formed V-notches 14 adapted to receive the tool bar. A plurality of bolts 15 securely hold the tool bar 11 in clamping brackets 13 and effect a rigid attachment thereof with the mounting frame 12.

A vertically disposed pivot post 20 is rotatably carried in the mounting frame 12 and supports a longitudinally extended plow beam 21 for swinging movement about the vertical axis of the post 20. The plow beam 21 includes a lower depending shank 22 to which is rigidly secured a plowshare 23. The rigid connection between the shank and the plowshare is completed by a plurality of conventional plow bolts 24 received through apertures provided in an attachment pad 25 and extended through matching apertures provided in the plowshare.

The plowshare 23 includes a conventionally formed moldboard 30 provided with a concave earth engaging face 31 and a lower cutting edge 32. When the plowshare is motivated along a path of travel from right to left, as viewed in the drawing, the cutting edge 32 is angularly related to such a path and thereby cuts a shallow furrow of predetermined width, depending upon the angular inclination of the cutting edge relative to such a path. Also, the moldboard 30 urges the plow beam 21 in a clockwise direction about the pivot post 20, as viewed in FIG. 1, due to the reaction force of the displaced earth. Forwardly, integrally extended from the moldboard 30 of the plowshare is a deflecting member 33. The deflecting member 33 is preferably in the form of a relatively thin, substantially flat blade and located relative to the cutting edge 32 of the plowshare so as to be disposed below the surface of the earth when the plowshare 23 is in an operable position. A cutting edge 34 is provided on the deflecting member at the forward portion thereof, and is obliquely related to the path of travel of the plowshare so as to effect a counterclockwise swinging of the plow beam 21 as a result of the reaction force upon contacting an obstruction in such path of travel. The cutting edge 34 of the deflecting member 33 is preferably somewhat sharpened so as to minimize resistance to movement through the earth. However, the edge 34 is sufficiently dull to minimize injury to vegetation growing below the surface of the earth and yet effectively to deflect the plowshare 23 upon contact with such vegetation. It is to be noted that the deflecting member is entirely free of any supporting structures, such as an integral shank so that subterranean movement is totally unimpeded.

A powered articulated linkage, generally indicated at 40, is provided in the plow to effect swinging of the plowshare 23 from the operable position shown in full lines in FIG. 1 to a deflected position shown in dash lines. The linkage 40 includes a pressure fluid actuated ram 41 having a piston rod 42 pivotally connected at 43 to the plow beam 21. A link 44 is connected at one end by a pivot pin 45 to the ram 41 and at its opposite end by a bolt 46 to the mounting frame 12. Pressure fluid is selectively supplied from a suitable source (not shown) to the ram 41 through a hose 47 under the influence of a flow control valve 48. In the form of the invention shown, the ram 41 is a single-acting ram. Variations in the form of the ram 41, such as a double-acting type, and a more sophisticated control valve to permit power swinging of the beam 21 in both clockwise and counterclockwise directions as well as power holding and free floating positions will occur to persons skilled in the art of pressure fluid actuation.

A control arm 50 is rigidly laterally extended from the control valve 48 and includes an extended sensing tip portion 51. The sensing tip 51 is adapted to engage vegetation growing above the surface of the earth and to effect appropriate positioning of the control valve 48 and consequent actuation of the ram 41. Upon such actuation, the plow beam 21 is swung in a counterclockwise direction, as viewed in FIG. 1, to the deflected position shown in dash lines.

A strut 55 is rigidly horizontally extended from the mounting frame 12 and provides an anchorage for a biasing spring 56 interconnecting the link 44 with the strut. The spring 56 is effective to exert a force against the plow beam 21 to urge the plowshare 23 toward an operable position. An adjustable stop nut 57 is also provided on the mounting frame 12 to permit selective variation of such operable position.

*Operation*

Figure 3:
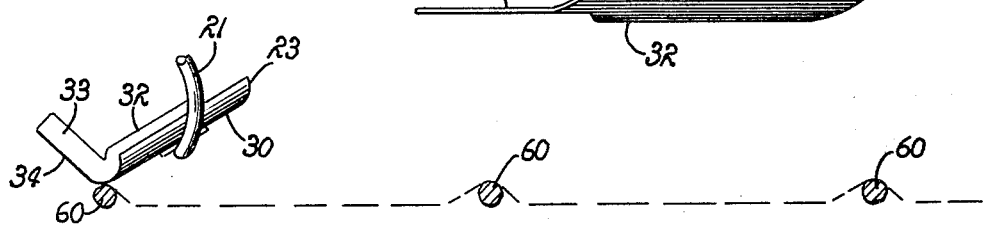
FIG. 3 is a schematic top plan view of a portion of a longitudinally extended row of growing plants undergoing cultivation by a plow of the present invention which is shown fragmentarily.

The operation of the described embodiment of the subject invention is believed to be readily apparent and is briefly summarized at this point. Assuming that the plow of the present invention is to be employed in cultivating closely adjacent to a plurality of individual grapevines schematically illustrated at 60 in FIG. 3, the draft member 10 is motivated along a path of travel substantially parallel to the longitudinal row of such vines. During such cultivation, it is desirable to effect a removal of all vegetation growing between adjacent plants in a row, while preventing injury to the cultivated plants. Consequently, the plowshare 23 must be deflected laterally from a path of travel substantially coincident with the individual vines 60, otherwise the cutting edge 32 of the moldboard 30 would cause substantial injury to the roots of the vine, and in many instances completely sever such roots. As viewed in FIG. 3, the path of travel of the plowshare during earth traversing movement is from right to left. It will be understood by those skilled in the art of tending vineyards that a return cultivating path will be made with the plow disposed in the side opposite from that shown to complete a thorough cultivation of the vineyard.

Under normal circumstances, the sensing tip 51 of the control arm 50 is effective to detect the presence of a grapevine 60 in the path of travel of the plowshare 23. Upon such detection, the control arm 50 is moved sufficiently to open the control valve 48 and to effect a retraction of piston rod 42 of the pressure fluid ram 41. This results in a swinging of the plow beam 21 in a counterclockwise direction, as viewed in FIG. 1, and a deflection of the plowshare 23 from its normal path of travel. Accordingly, damage to a grapevine standing in such normal path of travel is successfully avoided.

Figure 4:
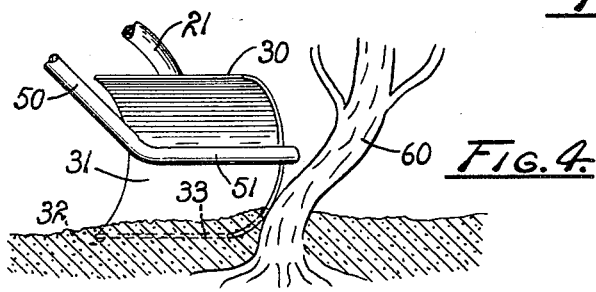
FIG. 4 is a fragmentary view in front elevation taken from a position indicated by the line 4—4 in FIG. 1, showing the plow thereof, but in conjunction with a different grapevine than that of FIG. 1.

However, the growth of many individual grapevines is not symmetrical about a vertical axis, and many assume the position illustrated fragmentarily in FIG. 4. With a grapevine 60 in such a position, the sensing tip 51 is unable to detect the presence of a sub-terranean portion of the grapevine lying in the normal path of travel of the plowshare 23. Obviously, it would not be practical to extend the length of the sensing tip 51, since it would render the control valve 48 responsive to vines and other obstructions not necessarily lying in the normal path of travel of the plowshare 23. With the present invention, the deflecting member 33 is effective to engage sub-terranean portions of the vine and any other obstruction not detected by the sensing tip 51. The leading edge, 34, being obliquely related to the normal path of travel of the plowshare, exerts a laterally directed force upon contact with the sub-terranean portion of the grapevine. Accordingly, continued motivation of the draft member 10 effects a deflection of the plowshare 23 from its normal path of travel. Since the edge 34 has limited cutting ability, injury to such sub-terranean portion is negligible.

It is to be noted that the deflecting member is entirely free from any supporting structure, such as a projecting shank, which would impede the movement of the blade through the earth and prevent the accurate formation of a furrow. Accordingly, the present invention provides an improved vineyard plow which is extremely efficient in the removal of vegetation closely adjacent to grapevines and the like while successfully avoiding any injury thereto and not impeding in any way the formation of uniform furrows by the plow.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

In a vineyard plow, the combination of a mobile draft member adapted to be motivated along a path of travel in ground traversing movement; a plow beam having a depending integral shank at one end; means mounting the beam on the draft member for pivotal movement about a vertical axis; a plowshare rigidly secured to the shank and having a cutting edge disposed angularly in relation to said path to cut a furrow of predetermined width during said ground traversing movement, said plowshare edge having forward and rearward portions relative to said movement; resilient means tending to swing said beam in a predetermined direction about said axis toward an operable position; stop means carried by said draft member to limit the swinging movement of said beam; power means interconnecting the draft member and said beam and adapted to swing the beam in a direction opposite to said predetermined direction; sensing means carried by said draft member at a predetermined distance above the surface of the earth; control means interconnecting said sensing means and power means to actuate the power means upon contact of an obstruction by said sensing means; and an elongated substantially flat, relatively thin blade forwardly extended from the forward portion of said plowshare and disposed in a horizontal plane below the surface of the earth when said plowshare is in an earth engaging position, said blade having an earth penetrating leading edge obliquely extended across said furrow and being sufficiently dull to engage portions of vegetation below the surface of the earth thereby to deflect said plowshare in a direction transversely related to said path of travel and away from said vegetation, the projected length of said elongated blade on a plane normal to said path of travel being substantially coextensive with the projected length of said plowshare cutting edge on the same plane.

References Cited by the Examiner

UNITED STATES PATENTS

| | | | |
|---|---|---|---|
| 2,386,559 | 10/45 | Laikam | 172—233 |
| 2,608,146 | 8/52 | Lund | 172—5 |

FOREIGN PATENTS

| | | |
|---|---|---|
| 1,199,156 | 6/59 | France. |
| 1,243,247 | 8/60 | France. |
| 1,250,512 | 12/60 | France. |
| 1,255,060 | 1/61 | France. |
| 1,261,545 | 4/61 | France. |

ABRAHAM G. STONE, *Primary Examiner.*